(12) United States Patent
Trinh et al.

(10) Patent No.: US 7,957,311 B2
(45) Date of Patent: Jun. 7, 2011

(54) PROGRAMMABLE HARDWARE-BASED TRAFFIC POLICING

(75) Inventors: Man Trinh, San Jose, CA (US); Goichiro Ono, San Jose, CA (US); Yihui Wu, Cupertino, CA (US)

(73) Assignee: Bay Microsystems, Inc., San Jose, CA (US)

( * ) Notice: Subject to any disclaimer, the term of this patent is extended or adjusted under 35 U.S.C. 154(b) by 280 days.

(21) Appl. No.: 12/045,507

(22) Filed: Mar. 10, 2008

(65) Prior Publication Data

US 2008/0219160 A1   Sep. 11, 2008

Related U.S. Application Data

(60) Provisional application No. 60/893,958, filed on Mar. 9, 2007.

(51) Int. Cl.
*H04L 12/26* (2006.01)
(52) U.S. Cl. ........................................................ 370/252
(58) Field of Classification Search .......... 370/230–231, 370/252–255, 465–469, 474; 726/1, 4
See application file for complete search history.

(56) References Cited

U.S. PATENT DOCUMENTS

| | | | | |
|---|---|---|---|---|
| 6,046,979 A * | 4/2000 | Bauman | | 370/229 |
| 7,492,763 B1 * | 2/2009 | Alexander, Jr. | | 370/389 |
| 2003/0223369 A1 * | 12/2003 | Anderson | | 370/235 |
| 2004/0005896 A1 * | 1/2004 | Davis et al. | | 455/446 |
| 2005/0125688 A1 * | 6/2005 | Ogawa et al. | | 713/200 |
| 2005/0135378 A1 * | 6/2005 | Rabie et al. | | 370/395.21 |

* cited by examiner

*Primary Examiner* — Kwang B Yao
*Assistant Examiner* — Juvena Loo

(57) ABSTRACT

A hardware-based technique for policing traffic in a network node involves programming a set of algorithm-specific policing primitives that establishes a relationship between condition primitives and action primitives and populating a searchable memory with a set of indexed action primitives. Action primitives are then selected from the searchable memory in response to condition primitives related to a received datagram. Policing actions related to the datagram are performed in response to the action primitive. Because the algorithm-specific policing primitives are programmable, a network node can be adapted to implement a wide variety of policing algorithms. Additionally, multiple different policing algorithms can be implemented in hardware without the need for a different set of combinational logic for each different policing algorithm.

22 Claims, 14 Drawing Sheets

Action Module 152

Searchable Memory 154

| Index | Action Primitive |
|---|---|
| | |

- Policing Algorithm 1
- Policing Algorithm 2
- Policing Algorithm 3
- Policing Algorithm 4

| srTCM Color Blind | Condition Primitive | | Action Primitive | | | | | | |
|---|---|---|---|---|---|---|---|---|---|
| In Color | Fail1 | Fail2 | Dec1 | Dec2 | Out Color | Report Fail1 | Report Fail2 | Drop |
| 00 | 0 | 0 | 0 | 1 | 00 | 0 | 0 | 0 |
| 00 | 0 | 1 | 1 | 0 | 01 | 0 | 1 | 0 |
| 00 | 1 | 0 | 0 | 1 | 00 | 0 | 0 | 0 |
| 00 | 1 | 1 | 0 | 0 | 10 | 1 | 1 | 0 |
| 01 | 0 | 0 | 1 | 1 | 00 | 0 | 0 | 0 |
| 01 | 0 | 1 | 0 | 0 | 01 | 0 | 1 | 0 |
| 01 | 1 | 0 | 0 | 1 | 00 | 0 | 0 | 0 |
| 01 | 1 | 1 | 1 | 0 | 10 | 1 | 1 | 0 |
| 10 | 0 | 0 | 0 | 1 | 00 | 0 | 0 | 0 |
| 10 | 0 | 1 | 0 | 0 | 01 | 0 | 1 | 0 |
| 10 | 1 | 0 | 1 | 1 | 00 | 0 | 0 | 0 |
| 10 | 1 | 1 | 0 | 0 | 10 | 1 | 1 | 0 |

102 — Condition Primitive
106 — Action Primitive

| Condition Primitive | | Action Primitive | |
|---|---|---|---|
| Full1 | Full2 | Inc1 | Inc2 |
| 0 | 0 | 0 | 1 |
| 0 | 1 | 1 | 0 |
| 1 | 0 | 0 | 1 |
| 1 | 1 | 0 | 0 |

104 — Condition Primitive
108 — Action Primitive

| srTCM Color Aware | Condition Primitive | | Action Primitive | | | | | | |
|---|---|---|---|---|---|---|---|---|---|
| In Color | Fail1 | Fail2 | Dec1 | Dec2 | Out Color | Report Fail1 | Report Fail2 | Drop |
| 00 | 0 | 0 | 0 | 1 | 00 | 0 | 0 | 0 |
| 00 | 0 | 1 | 1 | 0 | 01 | 0 | 1 | 0 |
| 00 | 1 | 0 | 0 | 1 | 00 | 1 | 0 | 0 |
| 00 | 1 | 1 | 0 | 0 | 10 | 0 | 1 | 0 |
| 01 | 0 | 0 | 1 | 0 | 01 | 0 | 0 | 0 |
| 01 | 0 | 1 | 1 | 0 | 01 | 1 | 0 | 0 |
| 01 | 1 | 0 | 0 | 0 | 10 | 1 | 0 | 0 |
| 01 | 1 | 1 | 0 | 0 | 10 | 0 | 0 | 0 |
| 10 | 0 | 1 | 0 | 0 | 10 | 0 | 0 | 0 |
| 10 | 1 | 0 | 0 | 0 | 10 | 0 | 0 | 0 |
| 10 | 1 | 1 | 0 | 0 | 10 | 0 | 0 | 0 |

| Condition Primitive | | Action Primitive | |
|---|---|---|---|
| Full1 | Full2 | Inc1 | Inc2 |
| 0 | 0 | 0 | 1 |
| 0 | 1 | 1 | 0 |
| 1 | 0 | 0 | 1 |
| 1 | 1 | 0 | 0 |

FIG.5B

FIG.6A trTCM Color Blind

| | Condition Primitive | | Action Primitive | | | | | |
|---|---|---|---|---|---|---|---|---|
| In Color | Fail1 | Fail2 | Dec1 | Dec2 | Out Color | Report Fail1 | Report Fail2 | Drop |
| 00 | 0 | 0 | 1 | 1 | 00 | 0 | 0 | 0 |
| 00 | 0 | 1 | 1 | 0 | 01 | 0 | 1 | 0 |
| 00 | 1 | 0 | 0 | 0 | 10 | 1 | 0 | 0 |
| 00 | 1 | 1 | 0 | 0 | 10 | 1 | 0 | 0 |
| 01 | 0 | 0 | 1 | 1 | 00 | 0 | 0 | 0 |
| 01 | 0 | 1 | 1 | 0 | 01 | 0 | 1 | 0 |
| 01 | 1 | 0 | 0 | 0 | 10 | 1 | 0 | 0 |
| 01 | 1 | 1 | 0 | 0 | 10 | 1 | 0 | 0 |
| 10 | 0 | 0 | 0 | 0 | 00 | 1 | 1 | 0 |
| 10 | 0 | 1 | 0 | 0 | 01 | 0 | 1 | 0 |
| 10 | 1 | 0 | 0 | 0 | 10 | 1 | 0 | 0 |
| 10 | 1 | 1 | 0 | 0 | 10 | 1 | 0 | 0 |

| Condition Primitive | | Action Primitive | |
|---|---|---|---|
| Full1 | Full2 | Inc1 | Inc2 |
| 0 | 0 | 0 | 1 |
| 0 | 1 | 1 | 0 |
| 1 | 0 | 0 | 1 |
| 1 | 1 | 0 | 0 |

FIG.6B

| trTCM Color Aware | | Condition Primitive 102 | | Action Primitive 106 | | | | | | Condition Primitive 104 | | Action Primitive 108 | |
|---|---|---|---|---|---|---|---|---|---|---|---|---|---|
| | In Color | Fail1 | Fail2 | Dec1 | Dec2 | Out Color | Report Fail1 | Report Fail2 | Drop | Full1 | Full2 | Inc1 | Inc2 |
| | 00 | 0 | 0 | 1 | 1 | 00 | 0 | 0 | 0 | 0 | 0 | 0 | 1 |
| | 00 | 0 | 1 | 1 | 0 | 01 | 0 | 1 | 0 | 0 | 1 | 1 | 0 |
| | 00 | 1 | 0 | 0 | 0 | 10 | 1 | 0 | 0 | 1 | 0 | 0 | 1 |
| | 00 | 1 | 1 | 0 | 0 | 10 | 1 | 0 | 0 | 1 | 1 | 0 | 0 |
| | 01 | 0 | 0 | 1 | 0 | 01 | 0 | 0 | 0 | | | | |
| | 01 | 0 | 1 | 1 | 0 | 01 | 0 | 1 | 0 | | | | |
| | 01 | 1 | 0 | 0 | 0 | 10 | 1 | 0 | 0 | | | | |
| | 01 | 1 | 1 | 0 | 0 | 10 | 1 | 0 | 0 | | | | |
| | 10 | 0 | 0 | 0 | 0 | 10 | 0 | 0 | 0 | | | | |
| | 10 | 0 | 1 | 0 | 0 | 10 | 0 | 0 | 0 | | | | |
| | 10 | 1 | 0 | 0 | 0 | 10 | 0 | 0 | 0 | | | | |
| | 10 | 1 | 1 | 0 | 0 | 10 | 0 | 0 | 0 | | | | |

| MEF Color Blind | Condition Primitive 102 | | Action Primitive 106 | | | | |
|---|---|---|---|---|---|---|---|
| In Color | Fail1 | Fail2 | Dec1 | Dec2 | Out Color | Report Fail1 | Report Fail2 | Drop |
| 00 | 0 | 0 | 0 | 1 | 00 | 0 | 0 | 0 |
| 00 | 0 | 1 | 1 | 0 | 01 | 0 | 1 | 0 |
| 00 | 1 | 0 | 0 | 1 | 00 | 1 | 0 | 0 |
| 00 | 1 | 1 | 0 | 0 | 10 | 0 | 1 | 0 |
| 01 | 0 | 0 | 0 | 1 | 00 | 0 | 0 | 0 |
| 01 | 0 | 1 | 1 | 0 | 01 | 0 | 1 | 0 |
| 01 | 1 | 0 | 0 | 1 | 00 | 1 | 0 | 0 |
| 01 | 1 | 1 | 0 | 0 | 10 | 0 | 1 | 0 |
| 10 | 0 | 0 | 1 | 1 | 00 | 0 | 0 | 0 |
| 10 | 0 | 1 | 1 | 0 | 01 | 0 | 1 | 0 |
| 10 | 1 | 1 | 0 | 0 | 10 | 1 | 1 | 0 |

| Condition Primitive 104 | | Action Primitive 108 | |
|---|---|---|---|
| Full1 | Full2 | Inc1 | Inc2 |
| 0 | 0 | 0 | 1 |
| 0 | 1 | 1 | 0 |
| 1 | 0 | 0 | 1 |
| 1 | 1 | 0 | 0 |

Table 100:

| | Condition Primitive (102) | | | Action Primitive (106) | | | | | |
|---|---|---|---|---|---|---|---|---|---|
| | In Color | Fail1 | Fail2 | Dec1 | Dec2 | Out Color | Report Fail1 | Report Fail2 | Drop |
| MEF Color Aware | 00 | 0 | 0 | 0 | 1 | 00 | 0 | 0 | 0 |
| | 00 | 0 | 1 | 1 | 0 | 01 | 0 | 1 | 0 |
| | 00 | 1 | 0 | 0 | 1 | 00 | 1 | 0 | 0 |
| | 00 | 1 | 1 | 1 | 0 | 10 | 0 | 1 | 0 |
| | 01 | 0 | 1 | 1 | 0 | 01 | 0 | 0 | 0 |
| | 01 | 1 | 0 | 0 | 0 | 01 | 1 | 0 | 0 |
| | 01 | 1 | 1 | 1 | 0 | 10 | 0 | 0 | 0 |
| | 10 | 0 | 0 | 0 | 0 | 10 | 0 | 0 | 0 |
| | 10 | 0 | 1 | 0 | 0 | 10 | 0 | 0 | 0 |
| | 10 | 1 | 0 | 0 | 0 | 10 | 0 | 0 | 0 |
| | 10 | 1 | 1 | 0 | 0 | 10 | 0 | 0 | 0 |

| Condition Primitive (104) | | Action Primitive (108) | |
|---|---|---|---|
| Full1 | Full2 | Inc1 | Inc2 |
| 0 | 0 | 0 | 1 |
| 0 | 1 | 1 | 0 |
| 1 | 0 | 0 | 1 |
| 1 | 1 | 0 | 0 |

| In Color | Condition Primitive | | Action Primitive | | | | | |
|---|---|---|---|---|---|---|---|---|
| | Fail1 | Fail2 | Dec1 | Dec2 | Out Color | Report Fail1 | Report Fail2 | Drop |
| 00 | 0 | 0 | 1 | 0 | 00 | 0 | 0 | 0 |
| 00 | 0 | 1 | 1 | 0 | 00 | 0 | 0 | 0 |
| 00 | 1 | 0 | 0 | 1 | 01 | 1 | 0 | 0 |
| 00 | 1 | 1 | 0 | 0 | 10 | 1 | 1 | 0 |
| 01 | 0 | 0 | 1 | 0 | 00 | 0 | 0 | 0 |
| 01 | 0 | 1 | 1 | 0 | 00 | 0 | 1 | 0 |
| 01 | 1 | 0 | 0 | 1 | 01 | 1 | 0 | 0 |
| 01 | 1 | 1 | 0 | 0 | 10 | 1 | 1 | 0 |
| 10 | 0 | 0 | 1 | 1 | 00 | 0 | 0 | 0 |
| 10 | 0 | 1 | 1 | 0 | 00 | 1 | 0 | 0 |
| 10 | 1 | 0 | 0 | 1 | 01 | 1 | 0 | 0 |
| 10 | 1 | 1 | 0 | 0 | 10 | 1 | 1 | 0 |

| Condition Primitive | | Action Primitive | |
|---|---|---|---|
| Full1 | Full2 | Inc1 | Inc2 |
| 0 | 0 | 1 | 1 |
| 0 | 1 | 1 | 0 |
| 1 | 0 | 0 | 1 |
| 1 | 1 | 0 | 0 |

FIG. 8A

| Condition Primitive | | | Action Primitive | | | | | |
|---|---|---|---|---|---|---|---|---|
| In Color | Fail1 | Fail2 | Dec1 | Dec2 | Out Color | Report Fail1 | Report Fail2 | Drop |
| 00 | 0 | 0 | 0 | 1 | 00 | 0 | 0 | 0 |
| 00 | 0 | 1 | 0 | 0 | 10 | 0 | 1 | 0 |
| 00 | 1 | 0 | 0 | 1 | 00 | 0 | 0 | 0 |
| 00 | 1 | 1 | 0 | 0 | 10 | 0 | 1 | 0 |
| 01 | 0 | 0 | 0 | 1 | 00 | 0 | 0 | 0 |
| 01 | 0 | 1 | 0 | 0 | 10 | 0 | 1 | 0 |
| 01 | 1 | 0 | 0 | 1 | 00 | 0 | 0 | 0 |
| 01 | 1 | 1 | 0 | 0 | 10 | 0 | 1 | 0 |
| 10 | 0 | 0 | 0 | 1 | 00 | 0 | 0 | 0 |
| 10 | 0 | 1 | 0 | 0 | 10 | 0 | 1 | 0 |
| 10 | 1 | 0 | 0 | 1 | 00 | 0 | 0 | 0 |
| 10 | 1 | 1 | 0 | 0 | 10 | 0 | 1 | 0 |

| Condition Primitive | | Action Primitive | |
|---|---|---|---|
| Full1 | Full2 | Inc1 | Inc2 |
| 0 | 0 | 1 | 1 |
| 0 | 1 | 1 | 0 |
| 1 | 0 | 0 | 1 |
| 1 | 1 | 0 | 0 |

FIG. 8B

PROGRAMMABLE HARDWARE-BASED TRAFFIC POLICING

CROSS-REFERENCE TO RELATED APPLICATIONS

This application is entitled to the benefit of provisional U.S. Patent Application Ser. No. 60/893,958, filed Mar. 9, 2007, the disclosure of which is incorporated by reference herein in its entirety.

FIELD OF THE INVENTION

The invention relates generally to implementing policing algorithms for network traffic, and more particularly to implementing programmable hardware-based policing algorithms.

BACKGROUND OF THE INVENTION

In addition to providing relatively high bandwidth network services to corporate clients, network service providers are moving to offer bundled multimedia services, e.g., voice, video, and data, to residential customers. This move to bundled multimedia services has placed demands on the networking equipment at the edge of the network. Quality of Service (QoS) control is critical to providing bundled multimedia services and one important QoS function involves controlling the data rate provided to each user for each different traffic type. Controlling the data rate provided to each user for each different traffic type involves admission control and/or bandwidth enforcement mechanisms, both of which are generally referred to as traffic policing or traffic metering.

In a typical traffic policing application, a service provider defines a traffic profile to which a customer's traffic needs to conform. Network traffic that is classified into the profile is then passed, marked to a lower priority, dropped, and/or identified as exceeding a bandwidth limitation. Some commonly used policing algorithms include single rate Three Color Marker (srTCM), two rate Three Color Marker (trTCM), and Metro Ethernet Forum (MEF) service policer. Additional policing algorithms include Frame Relay time-based, ATM leaky bucket, and vendor proprietary policing algorithms.

In first generation network equipment, traffic policing was typically implemented in software. Although software-based policing solutions are flexible, they are not able to process network traffic at the speeds required for current and emerging networks. In order to support the throughput requirements of current and emerging networks, policing solutions have been implemented in hardware. Hardware-based policing solutions reduce a policing algorithm to a set of condition primitives and corresponding action primitives in which the action primitives are generated in response to the condition primitives. Condition primitives may include, for example, a series of bits that indicate the incoming traffic color, whether enough credits are available to forward a packet, and whether a credit bucket is full. Action primitives may include, for example, a series of bits that indicate whether a credit bucket should be decremented to account for a forwarded packet, whether a packet should be dropped, or whether a credit bucket should be refreshed.

In conventional hardware-based policing solutions, combinational logic, which is designed to implement one specific policing algorithm, is fabricated into a semiconductor device. The combinational logic has no memory and is fixed at the circuit level. Because the combinational logic can only implement one policing algorithm, a different set of combinational logic is required to implement each different policing algorithm. Additionally, once a semiconductor device is fabricated, the combinational logic cannot be changed to implement a different policing algorithm. While implementing a policing algorithm using fixed combinational logic enables high speed policing of network traffic, fixed combinational logic does not provide the flexibility to adapt to support different policing algorithms.

SUMMARY OF THE INVENTION

A hardware-based technique for policing traffic in a network node involves programming a set of algorithm-specific policing primitives that establishes a relationship between condition primitives and action primitives and populating a searchable memory with a set of indexed action primitives. Action primitives are then selected from the searchable memory in response to condition primitives related to a received datagram. Policing actions related to the datagram are performed in response to the action primitive. Because the algorithm-specific policing primitives are programmable, a network node can be adapted to implement a wide variety of policing algorithms. Additionally, multiple different policing algorithms can be implemented in hardware without the need for a different set of combinational logic for each different policing algorithm. Further, the flexibility of the solution allows the network node to be programmed to implement various standardized policing algorithms as well as new policing algorithms that have not yet been developed.

A hardware-based method for policing traffic in a network node involves receiving a programming input that defines a relationship between condition primitives and action primitives, storing a set of indexed action primitives according to the defined relationship, identifying a condition primitive in response to a datagram that is received at the network node, generating an index from the condition primitive, using the index to select an action primitive from the stored set of indexed action primitives, and performing a policing action related to the datagram in response to the selected action primitive.

A hardware-based system for policing traffic in a network node includes a programming interface configured to receive a programming input that defines a relationship between condition primitives and action primitives, a system for obtaining a condition primitive related to a received datagram, and a policing module configured to select an action primitive in response to the condition primitive and to perform a policing action related to the datagram in response to the selected action primitive. The policing module further includes a condition module configured to generate an index from a condition primitive that is related to a received datagram and an action module configured to select an action primitive in response to the index, where the action module includes memory for storing a set of indexed action primitives according to the defined relationship.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 4 depicts an action module with four different sets of policing primitives that are simultaneously stored in a searchable memory.

FIGS. 5A and 5B depict two different sets of algorithm-specific policing primitives that are used to implement a single rate Three Color Marker (srTCM) policing algorithm.

FIGS. 6A and 6B depict two different sets of algorithm-specific policing primitives that are used to implement a two rate Three Color Marker (trTCM) policing algorithm.

FIGS. 7A and 7B depict two different sets of algorithm-specific policing primitives that are used to implement a Metro Ethernet Forum (MEF) 10 policing algorithm.

FIGS. 8A and 8B depict two different sets of algorithm-specific policing primitives that are used to implement a non-standard policing algorithm.

Throughout the description, similar reference numbers may be used to identify similar elements.

DETAILED DESCRIPTION

Figure 1:
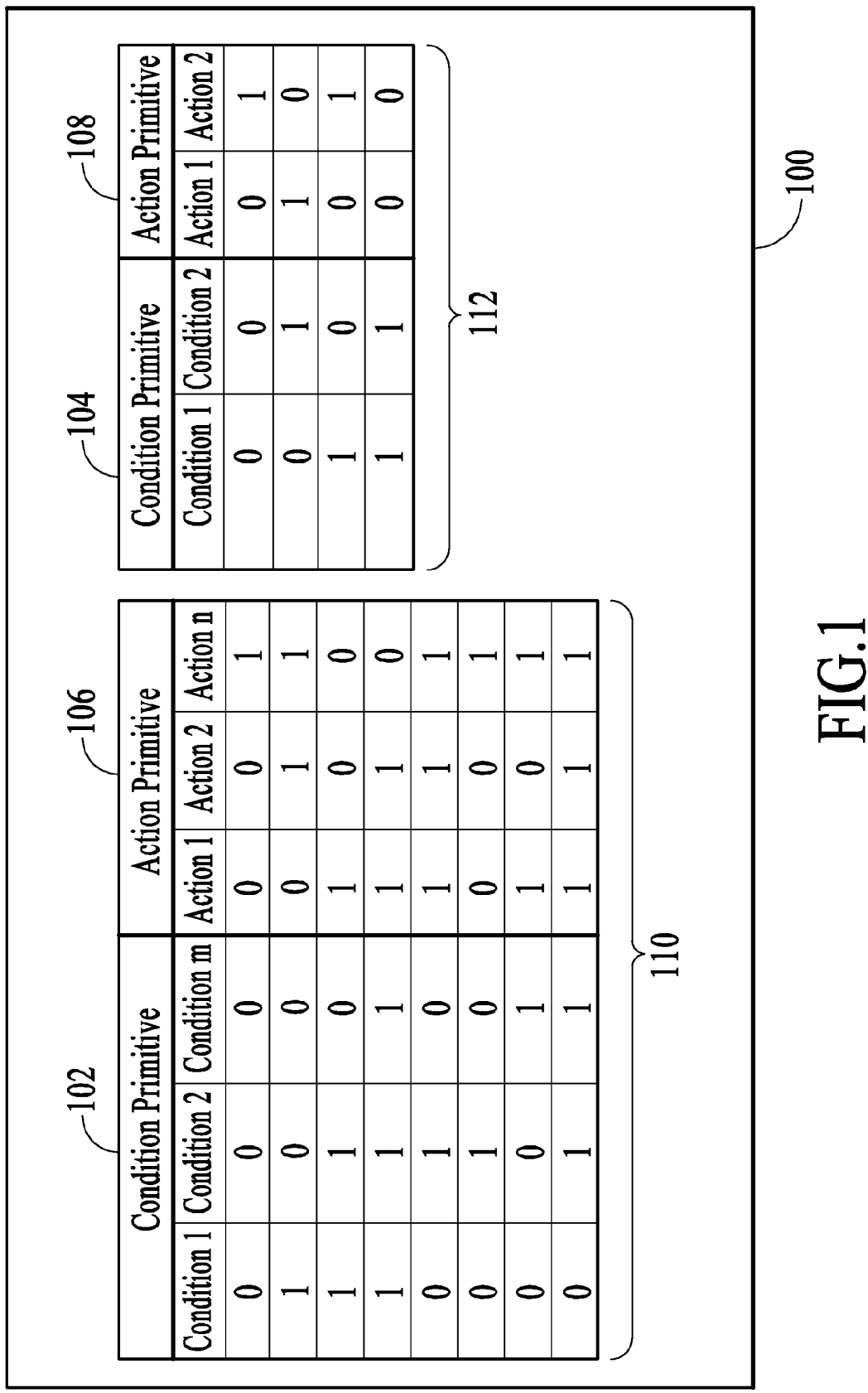
FIG. 1 depicts an example of a set of algorithm-specific policing primitives that are used to implement a policing algorithm.

FIG. 1 depicts an example of a set 100 of algorithm-specific policing primitives that are used to implement a policing algorithm. The set of algorithm-specific policing primitives includes condition primitives 102 and 104 and corresponding action primitives 106 and 108. In FIG. 1, corresponding condition and action primitives are located in the same row. When a condition that is represented by a condition primitive exists, then an action that is represented by the corresponding action primitive should occur. As can be seen from FIG. 1, the algorithm-specific policing primitives define a relationship between the condition primitives and the action primitives. In the example of FIG. 1, the set of algorithm-specific policing primitives is organized into two subsets, 110 and 112. The first subset 110 of policing primitives includes condition primitives 102 and action primitives 106 that are related to datagrams and the second subset 112 of policing primitives includes condition primitives 104 and action primitives 108 that are related to bucket fullness. In the first subset, examples of condition primitives include a series of bits that indicate the incoming color of a packet and whether the credit requirement of the packet exceeds the available credits in the corresponding credit bucket(s). Examples of action primitives include a series of bits that indicate the color of a packet should be changed, that a credit bucket should be decremented, that a credit bucket failure should be reported (e.g., when a packet length exceeds the available credits), and an indication that a packet should be dropped. In the second subset of policing primitives, examples of condition primitives include a series of bits that indicate whether or not a credit bucket is full and examples of action primitives include a series of bits that indicate whether or not a credit bucket should be refreshed. Although some examples of condition primitives and corresponding action primitives are identified, other condition and action primitives related to traffic policing are possible.

The set 100 of algorithm-specific policing primitives depicted in FIG. 1 is established to implement one particular policing algorithm. For example, the set of algorithm-specific policing primitives is established to implement a policing algorithm such as srTCM, trTCM, or the MEF service policer. Additional sets of algorithm-specific policing primitives may also be used to implement other policing algorithms. As will be described in more detail below, a policing engine can be programmed to simultaneously store different sets of algorithm-specific poling primitives that can be used by a network node to implement multiple different hardware-based policing algorithms. In an embodiment, the stored sets of algorithm-specific policing primitives can be used to simultaneously implement different policing algorithms.

Figure 2:
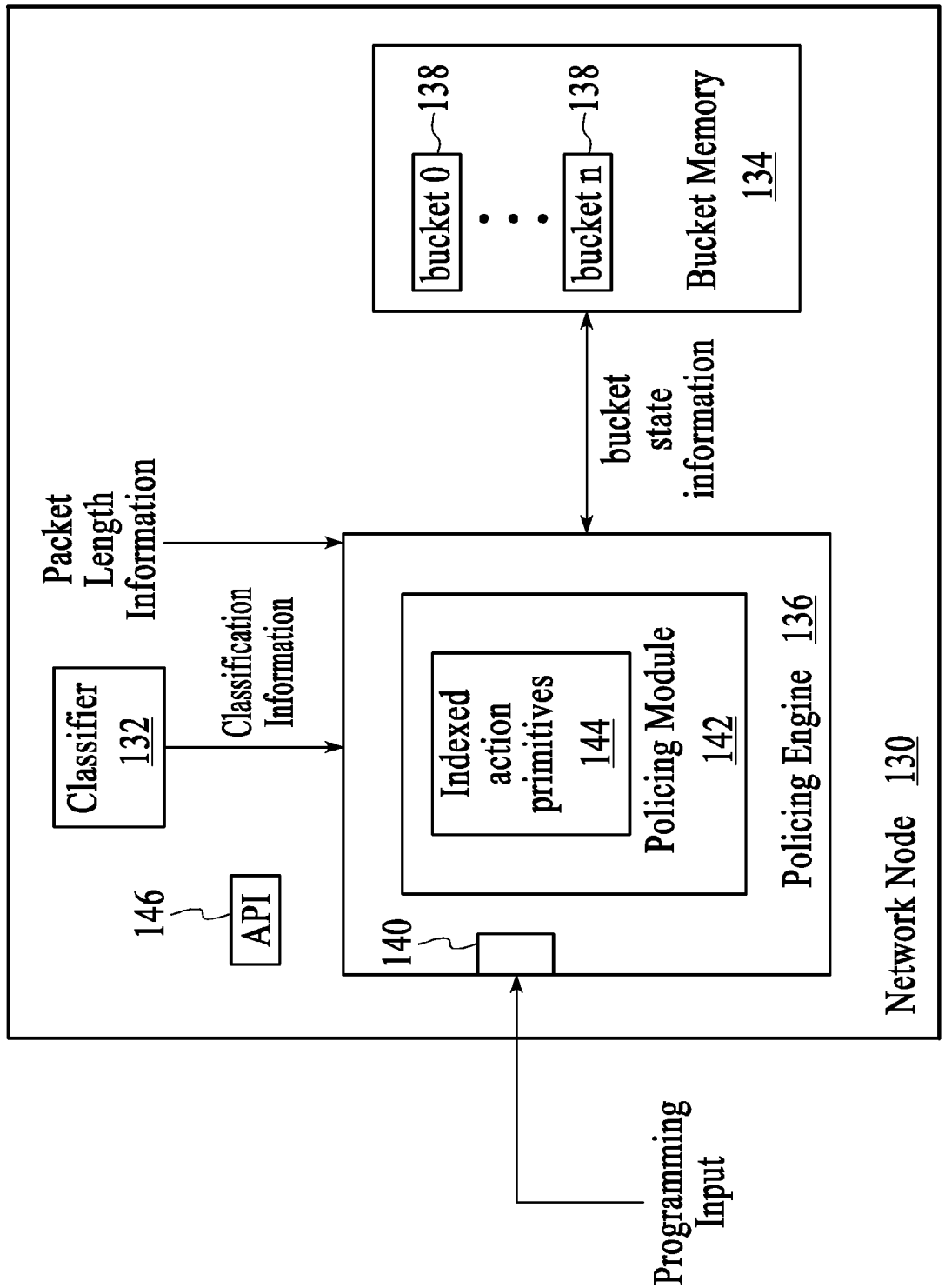
FIG. 2 depicts a network node that is configured to implement hardware-based policing in accordance with an embodiment of the invention.

FIG. 2 depicts a network node 130 such as a router or switch that is configured to implement hardware-based policing in accordance with an embodiment of the invention. The network node includes a classifier 132, a bucket memory 134, and a policing engine 136. The classifier classifies incoming datagrams according to some information related to the datagram, where the datagram is, for example, an IP packet, an Ethernet packet, an ATM cell, or a Frame Relay frame. Various different classification techniques can be used to classify an incoming datagram. Datagrams such as variable length IP or Ethernet packets can be classified based on, for example, header information and/or incoming or outgoing port information.

The classifier 132 provides classification information to the policing engine 136. For example, the classifier provides a policy identifier to the policing engine that is used to obtain a policy instruction. The policy instruction for a datagram identifies the policing algorithm to be used and the rate or rates that are to be applied to the datagram. In an embodiment, the rate or rates that are to be applied to a datagram are identified in terms of credit bucket refresh rates. Alternatively, the rate or rates can be identified using other techniques. The classifier also provides information that is used to identify credit bucket state information.

The bucket memory 134 is a memory that stores state information 138 related to credit buckets that are used to control traffic rates. For example, the bucket state information is used to generate some aspect of a condition primitive. In an embodiment, the bucket state information for each credit bucket is a 26-bit register value that indicates an amount of available credits. The bucket state information is provided to the policing engine and the policing engine provides updated bucket state information to the bucket memory. In an embodiment, the bucket memory maintains bucket state information for each credit bucket that has been established. The number of credit buckets that the bucket memory can accommodate is dependent on the size of the bucket memory. In FIG. 2, the bucket memory includes bucket state information for credit buckets 0 to n. Additionally, the number of credit buckets can change over time. Although credit buckets are described herein as one example of a rate tracking mechanism, other techniques can be used to implement rate tracking, e.g., token buckets, accumulators. The terms credit bucket, bucket memory, and bucket state information are used herein to refer to a mechanism for tracking the volume of traffic in terms of bits, bytes, megabits, etc.

The policing engine 136 manages the policing of traffic within the network node 130. For example, policing operations involve tracking the volume of traffic on a per-flow basis, marking datagrams, and/or dropping datagrams. The policing engine includes a programming interface 140 and a policing module 142 that stores a searchable set of indexed action primitives 144. The programming interface enables a programming input to be provided to the policing module and information that is used to generate the searchable set of indexed action primitives is provided to the policing module through the programming interface. The searchable set of indexed action primitives is stored in a searchable memory within the policing module and is programmed to implement a policing algorithm according to a set of algorithm-specific policing primitives as described with reference to FIG. 1. In particular, the searchable set of indexed action primitives is populated within the policing module such that a condition primitive returns a corresponding action primitive as defined by a preprogrammed set of algorithm-specific policing primitives. In an embodiment, the programming input establishes a set of algorithm-specific policing primitives as depicted in FIG. 1. In an embodiment, the network node includes an application programming interface (API) 146 that enables the programming of algorithm-specific policing primitives.

Figure 3A:
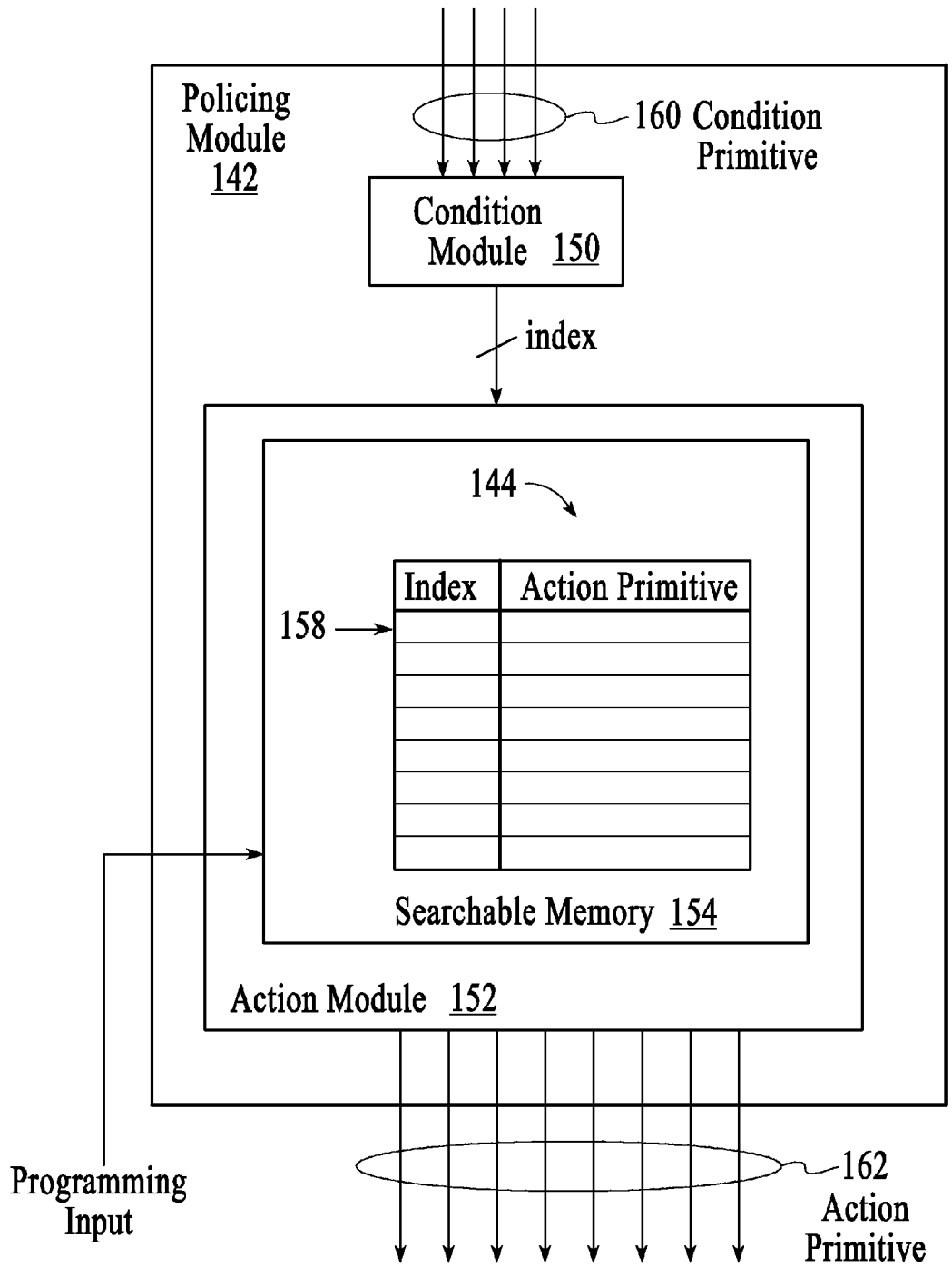
FIG. 3A depicts an expanded view of an embodiment of the policing module from FIG. 2.

FIG. 3A depicts an expanded view of an embodiment of the policing module 142 from FIG. 2. The policing module includes a condition module 150 and an action module 152. The condition module receives a condition primitive and generates an index in response. In an embodiment, the condition module in an encoder that includes combinational logic for generating an index in response to a condition primitive such as a 4-bit condition primitive. In an embodiment, the index is a 4-bit vector. Other size condition primitives and indexes are possible. In an embodiment, the index is the same as the condition primitive. In other embodiments, the condition primitive is encoded by the condition module into more or less bits than the condition primitive. For example, in cases with a large condition primitive, the condition module generates an index that has fewer bits than the condition primitive.

The action module 152 receives an index from the condition module 150 and outputs an action primitive in response. The action module includes a searchable memory that stores indexed action primitives. In an embodiment, the searchable memory 154 stores at least one set of indexed action primitives that is programmed to implement one policing algorithm. In particular, the set of indexed policing primitives is indexed to implement a policing algorithm according to a defined relationship between condition primitives and action primitives as described with reference to FIG. 1.

A set of indexed policing primitives 144 that includes a column of indexes and a column of action primitives is depicted in FIG. 3A. Indexes and action primitives on the same row correspond to each other. For example, the index in row 1 158 corresponds to the action primitive in row 1. The set of indexed action primitives includes an indexed action primitive that corresponds to each possible condition primitive. The action primitives may be different for each condition primitive or there may be action primitives that are the same for some condition primitives. The searchable memory is fully programmable via the programming interface to change the current set of indexed action primitives and to add or delete sets of indexed action primitives. In an embodiment, the searchable memory includes multiple sets of indexed action primitives that are specifically programmed to implement different policing algorithms. Although the searchable memory is graphically depicted in FIG. 3A as having rows and columns, the searchable memory can be configured in any way that enables the use of an index to select a corresponding action.

As mentioned above, the searchable memory can be programmed to include multiple sets of indexed action primitives that are specific to different policing algorithms. FIG. 4 depicts the action module 152 with four different sets of indexed action primitives that are simultaneously stored in the searchable memory 154 of the action module. The four different sets of indexed action primitives are programmed to implement four different policing algorithms, identified as policing algorithms 1-4. Although an example of an action module with four different sets of indexed action primitives is depicted in FIG. 4, the number of different sets of indexed action primitives can be different. In an embodiment, the number of sets of indexed action primitives is limited only by the size of the searchable memory. In an embodiment, the sets of indexed action primitives are selected in response to the traffic classification.

Referring back to FIG. 3A, in operation, a condition primitive 160 (e.g., a 4-bit condition primitive) is identified by the policing engine in response to a packet that is received at the network node. For example, a 4-bit condition primitive is generated in response to the color of a packet and a comparison of the packet length to bucket state information of two corresponding credit buckets. The 4-bit condition primitive is provided to the condition module 150 and an index is generated in response. The index is provided to the action module 152 and used to select an action primitive from the set of indexed action primitives 144 that is stored in the searchable memory 154. The action primitive that is selected from the set of indexed action primitives is output from the action module. For example, the action primitive 162 is output as a 7-bit vector. Policing actions related to the packet are then performed in response to the action primitive. For example, the policing actions may include changing the color of the packet, decrementing a credit bucket related to the packet, reporting a credit bucket failure (e.g., when a packet length exceeds the available credits), dropping the packet, and marking the packet. A similar operation is performed for the condition primitives related to the buckets, e.g., condition primitive 104 from FIG. 1, in which a policing action may include refreshing a credit bucket or credit buckets. Because the algorithm-specific policing primitives are fully programmable, a network node can be adapted to implement a wide variety of policing algorithms. Additionally, multiple different policing algorithms can be implemented in hardware without the need for a different set of combinational logic for each different policing algorithm. Further, the flexibility of the solution allows the network node to be programmed to implement new policing algorithms that have not yet been developed.

Figure 3B:
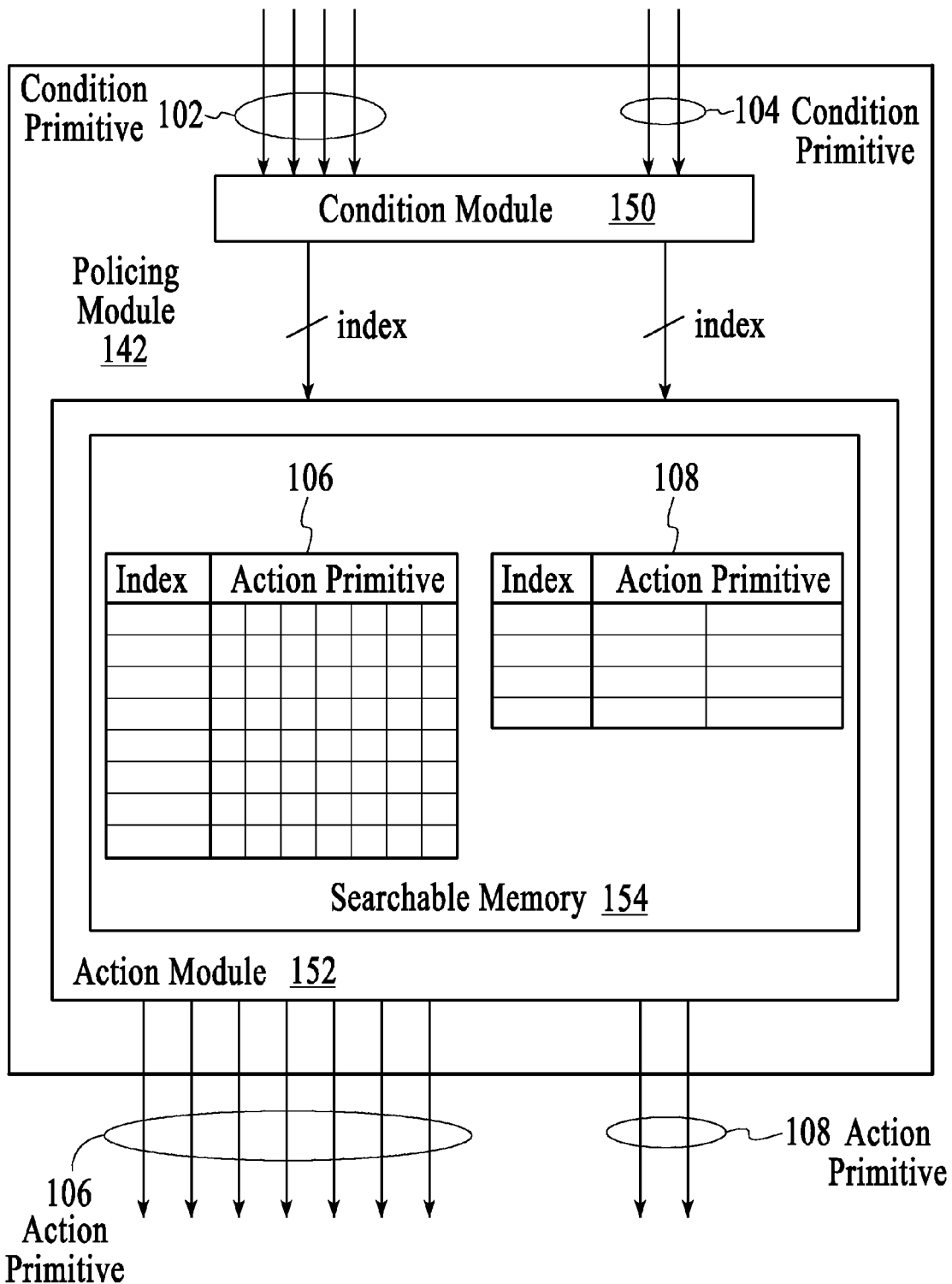
FIG. 3B depicts an expanded view of another embodiment of the policing module from FIG. 2.

FIG. 3B depicts an expanded view of another embodiment of the policing module 142 from FIG. 2. The embodiment of FIG. 3B is similar to the embodiment of FIG. 3A except that it more closely corresponds to the set of algorithm-specific policing primitives from FIG. 1. In particular, in the embodiment of FIG. 3B, the two subsets of condition and action primitives are handled separately such that the condition module generates a different index for each of the two different condition primitives. The indexes are used to select separate action primitives from the searchable memory 152 and the separate action primitives 106 and 108 are output in response to the corresponding condition primitives 102 and 104. In an embodiment, condition primitive 104 is processed and the corresponding actions are taken before condition primitive 102 is processed.

Examples of policing algorithms that can be implemented using the above-described technique are described with reference to FIGS. 5A-8B. FIGS. 5A and 5B depict two different sets of algorithm-specific policing primitives that are used to implement a single rate Three Color Marker (srTCM) policing algorithm. FIG. 5A illustrates a color blind implementation and FIG. 5B illustrates a color aware implementation. Referring to FIG. 5A, the srTCM policing algorithm is implemented using two credit buckets, credit bucket 1 and credit bucket 2. Credit bucket 1 is used to manage the Excess Burst Size (EBS) and credit bucket 2 is used to manage the Committed Burst Size (CBS) with both buckets having the same refresh rate, which is equal to the Committed Information Rate (CIR) as specified in the srTCM policing algorithm. Referring to the first subset 110 of condition and action primitives, the condition primitives 102 include a 2-bit "In Color" primitive, a 1-bit "Fail1" primitive, and a 1-bit "Fail2" primitive. The 2-bit In Color primitive uses two bits to identify the color of a datagram (e.g., red, green, or yellow). The 1-bit Fail1 primitive indicates whether or not credit bucket 1 has enough credits to accommodate the datagram and the 1-bit Fail2 primitive indicates whether or not credit bucket 2 has enough credits to accommodate the datagram. In the embodiment of FIG. 5A, a "0" indicates that the credit bucket does have enough credits (i.e., a "pass") and a "1" indicates that the credit bucket does not have enough credits (i.e., a "fail").

Still referring to the first subset 110 of condition and action primitives, the action primitives 106 include a 1-bit "Dec1" primitive, a 1-bit "Dec2" primitive, a 2-bit "Out Color" primitive, a 1-bit "Report Fail1" primitive, a 1-bit "Report Fail2" primitive, and a "Drop" primitive. The 1-bit Dec1 primitive indicates whether or not credit bucket 1 should be decremented (e.g., by the corresponding datagram size), the 1-bit Dec 2 primitive indicates whether or not credit bucket 2 should be decremented (e.g., by the corresponding datagram size), the 2-bit Out Color primitive indicates the color of the datagram upon output, the 1-bit Report Fail1 primitive indicates whether a failure at credit bucket 1 (e.g., Fail1=1) should be reported (e.g., "0" indicates do not report a failure and "1" indicates report a failure), the 1-bit Report Fail2 indicates whether a failure at credit bucket 2 (e.g., Fail2=1) should be reported (e.g., "0" indicates do not report a failure and "1" indicates report a failure), and the 1-bit Drop primitive indicates whether or not the datagram should be dropped (e.g., "0" indicates do not drop the packet and "1" indicates drop the packet).

In the second subset 112 of condition and action primitives, the condition primitives 104 include a 1-bit "Full1" primitive and a 1-bit "Full2" primitive. The 1-bit Full1 primitive indicates whether or not credit bucket 1 is full (e.g., "0" indicates not full and "1" indicates full), and the 1-bit Full2 primitive indicates whether or not credit bucket 2 is full (e.g., "0" indicates not full and "1" indicates full). The action primitives 108 include a 1-bit "Inc1" primitive and a 1-bit "Inc2" primitive. The 1-bit Inc1 primitive indicates whether or not credit bucket 1 should be incremented (e.g., "0" is do not increment and "1" is increment) and the 1-bit Inc2 primitive indicates whether or not credit bucket 2 should be incremented (e.g., "0" is do not increment and "1" is increment).

In an embodiment, the set of algorithm-specific policing primitives of FIG. 5A are programmed into the network node of FIG. 2 via the API and the programming interface. When a packet is received, the packet is classified, the srTCM policing algorithm is identified, and bucket state information for the corresponding buckets is obtained from the bucket memory. A first condition primitive is identified in response to the received packet. In particular, the condition primitive is generated in response to the color of the packet an in response to a comparison of the packet length to the available credits in buckets 1 and 2 as indicated by the bucket state information. The 4-bit condition primitive is used to generate an index and the index is used to select the corresponding action primitive as described above with reference to FIGS. 1-3. Policing actions related to the packet are then performed in response to the action primitive.

A second condition primitive is identified in response to the fullness of credit buckets 1 and 2. In particular, the condition primitive is a 2-bit condition primitive that is generated in response to whether or not each credit bucket is full up to a maximum number of credits. The 2-bit condition primitive is used to generate an index and the index is used to select the corresponding action primitive as described above with reference to FIGS. 1-3. Policing actions related to the packet are then performed in response to the action primitive. In an embodiment, condition primitive 104 is processed and the corresponding actions are taken before condition primitive 102 is processed.

Referring to FIG. 5B, the color aware srTCM policing algorithm is implemented using the same condition and action primitives as in FIG. 5A. The primary difference between the policing algorithm of FIG. 5A and the policing algorithm of FIG. 5B is that the action primitives are incoming color-dependent.

FIGS. 6A and 6B depict two different sets of algorithm-specific policing primitives that are used to implement a trTCM policing algorithm. FIG. 6A illustrates a color blind implementation and FIG. 6B illustrates a color aware implementation. In both cases, the trTCM policing algorithm is implemented using two credit buckets, credit bucket 1 and credit bucket 2. Credit bucket 1 has a capacity equal to the Peak Burst Size (PBS) and a refresh rate equal to the Peak Information Rate (PIR) and credit bucket 2 has a capacity equal to the Committed Burst Size (CBS) and a refresh rate equal to the Committed Information Rate (CIR) as specified in the trTCM policing algorithm. The condition and action primitives 102-108 in FIGS. 6A and 6B are similar to those described with reference to FIGS. 5A and 5B.

FIGS. 7A and 7B depict two different sets of algorithm-specific policing primitives that are used to implement a MEF10 policing algorithm. FIG. 7A illustrates a color blind implementation and FIG. 7B illustrates a color aware implementation. In both cases, the MEF10 policing algorithm is implemented using two credit buckets, credit bucket 1 and credit bucket 2. Credit bucket 1 has a capacity equal to the Excess Burst Size (EBS) and a refresh rate equal to the Excess Information Rate (EIR) and credit bucket 2 has a capacity equal to the CBS and a refresh rate equal to the CIR as specified in the MEF10 policing algorithm. The condition and action primitives 102-108 in FIGS. 7A and 7B are similar to those described with reference to FIGS. 5A and 5B.

While the above-described technique can be used to implement various standardized policing algorithms, the technique can also be used to implement non-standard or "vendor proprietary" policing algorithms. For example, a user can define a set of algorithm-specific policing primitives to implement a customized policing algorithm. FIGS. 8A and 8B depict two different sets of algorithm-specific policing primitives that are used to implement a non-standard policing algorithm. The policing algorithm is implemented using two credit buckets, credit bucket 1 and credit bucket 2 and traffic is classified to either "flow 1" or to "flow 2." Credit bucket 1 is used only by the traffic classified to flow 1 and credit bucket 2 is shared by traffic classified to both flow 1 and flow 2. In other words, flow 1 uses both credit buckets, but uses credit bucket 1 first before using credit bucket 2 and flow 2 uses only credit bucket 1. This is a non-standard technique for applying traffic policing. However, with the programming flexibility described above, this policing algorithm can be implemented using the sets of algorithm-specific policing primitives of FIGS. 8A and 8B. In an embodiment, two traffic profiles (and corresponding policing instructions) are also defined with the same rates and bursts. The first traffic profile uses the set of algorithm-specific policing primitives of FIG. 8A and is assigned to flow 1 and the second traffic profile uses the set of algorithm-specific policing primitives of FIG. 8B and is assigned to flow 2. Both flows use the same bucket state information for buckets 1 and 2.

Figure 9:
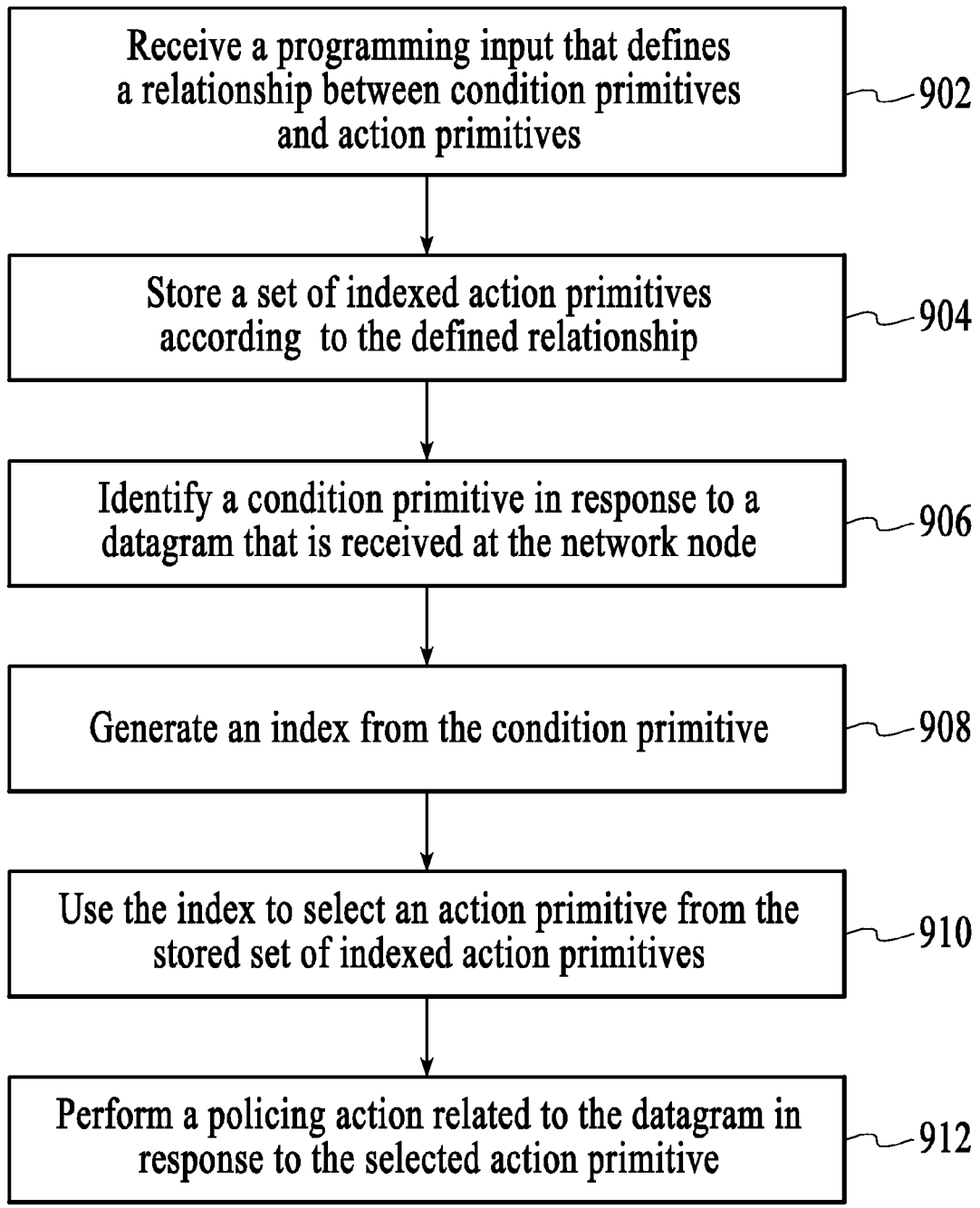
FIG. 9 depicts a process flow diagram of a hardware-based method for policing traffic in a network node in accordance with an embodiment of the invention.

FIG. 9 depicts a process flow diagram of a hardware-based method for policing traffic in a network node in accordance with an embodiment of the invention. At block 902, a programming input, which defines a relationship between condition primitives and action primitives, is received. At block 904, a set of indexed action primitives is stored according to the defined relationship. At block 906, a condition primitive is identified in response to a datagram that is received at the network node. At block 908, an index is generated from the condition primitive. At block 910, the index is used to select an action primitive from the stored set of indexed action primitives. At block 912, a policing action related to the datagram is performed in response to the selected action primitive.

In an embodiment, a coupling flag may be used to associate multiple credit buckets with each other so that spill over credits from credit bucket 2 are added to credit bucket 1 up to credit bucket 1's maximum credit capacity. In other words, if the coupling flag is set and if credit bucket 2 exceeds its maximum credit capacity, then the excess credits from credit bucket 2 can be added to credit bucket 1 as long as credit bucket 1 does not exceed its maximum credit capacity. In an embodiment, this is taken only when "Inc2" is enables and independent of "Inc1."

As used herein, a primitive refers to a bit or bits that indicate a policing condition or a policing action. In particular, a condition primitive refers to a bit or bits that indicate a condition related to traffic policing, an action primitive refers to a bit or bits that indicate an action related to traffic policing, and policing primitives refer to both condition and action primitives.

Although specific embodiments of the invention have been described and illustrated, the invention is not to be limited to the specific forms or arrangements of parts as described and illustrated herein. The invention is limited only by the claims.

What is claimed is:

1. A hardware-based method for policing traffic in a network node, the method comprising:
    receiving a programming input that defines a relationship between condition primitives and action primitives, wherein the condition primitives and the action primitives are used to implement a policing algorithm, each condition primitive including a series of bits that indicates an incoming color of a packet, whether enough credits are available to forward the packet, and whether a credit bucket is full, and each action primitive including a series of bits that indicates the outgoing color of a packet, whether a credit bucket should be decremented to account for a forwarded packet, whether a packet should be dropped, and whether the credit bucket should be refreshed;
    storing a set of indexed action primitives according to the defined relationship, wherein the stored set of indexed action primitives comprises multiple index and action primitive pairs, wherein each action primitive is specific to the policing algorithm and includes a series of bits that indicates the outgoing color of a packet, whether a credit bucket should be decremented to account for a forwarded packet, whether a packet should be dropped, and whether the credit bucket should be refreshed;
    identifying a condition primitive in response to a datagram that is received at the network node;
    generating an index from the condition primitive;
    using the index to select an action primitive from the stored set of indexed action primitives; and
    performing a policing action related to the datagram in response to the selected action primitive;
    wherein the stored set of indexed action primitives includes a decrement primitive that indicates whether or not credit should be decremented from a corresponding credit bucket and an increment primitive that indicates whether or not the corresponding credit bucket should be refreshed with credits according to a corresponding refresh rate; and
    wherein performing the policing action comprises at least one of decrementing credit from the corresponding credit bucket and refreshing credits of the corresponding credit bucket according to the corresponding refresh rate.

2. The hardware-based method of claim 1 wherein the set of indexed action primitives are stored in a searchable memory.

3. The hardware-based method of claim 1 further comprising:
    receiving another programming input that defines a second relationship between condition primitives and action primitives, wherein the second relationship defines a policing algorithm that is different from the first relationship; and
    storing a set of indexed action primitives according to the defined second relationship such that more than one set of indexed action primitives, defining different policing algorithms, are stored at the same time.

4. The hardware-based method of claim 1 wherein the relationship between the condition primitives and the action primitives defines a single rate three color marker (srTCM) policing algorithm.

5. The hardware-based method of claim 1 wherein the relationship between the condition primitives and the action primitives defines a two rate three color marker (trTCM) policing algorithm.

6. The hardware-based method of claim 1 wherein the relationship between the condition primitives and the action primitives defines a Metro Ethernet Forum (MEF) service policing algorithm.

7. The hardware-based method of claim 1 wherein the relationship between the condition primitives and the action primitives defines a non-standard user-defined policing algorithm.

8. The hardware-based method of claim 1 wherein the set of indexed action primitives determines the outgoing color of the datagram.

9. The hardware-based method of claim 1 wherein the set of indexed action primitives determines whether a policing failure will be reported.

10. The hardware-based method of claim 1 wherein the set of indexed action primitives determines whether the datagram will be dropped.

11. The hardware-based method of claim 1 wherein the set of indexed action primitives determines:
    the outgoing color of the datagram;
    whether a policing failure will be reported; and
    whether the datagram will be dropped.

12. A hardware-based system for policing traffic in a network node, the system comprising:
    a programming interface configured to receive a programming input that defines a relationship between condition primitives and action primitives, wherein the condition primitives and the action primitives are used to implement a policing algorithm, each condition primitive including a series of bits that indicates an incoming color of a packet, whether enough credits are available to forward the packet, and whether a credit bucket is full, and each action primitive including a series of bits that indicates the outgoing color of a packet, whether a credit bucket should be decremented to account for a forwarded packet, whether a packet should be dropped, and whether the credit bucket should be refreshed;

means for obtaining a condition primitive related to a received datagram; and a policing module configured to select an action primitive in response to the condition primitive and to perform a policing action related to the datagram in response to the selected action primitive, the policing module comprising:

a condition module configured to generate an index from a condition primitive that is related to a received datagram; and an action module configured to select an action primitive in response to the index, the action module comprising memory to store a set of indexed action primitives according to the defined relationship, wherein the stored set of indexed action primitives comprises multiple index and action primitive pairs, wherein each action primitive is specific to the policing algorithm and includes a series of bits that indicates the outgoing color of a packet, whether a credit bucket should be decremented to account for a forwarded packet, whether a packet should be dropped, and whether the credit bucket should be refreshed;

wherein the stored set of indexed action primitives includes a decrement primitive that indicates whether or not credit should be decremented from a corresponding credit bucket; and wherein the stored set of indexed action primitives includes an increment primitive that indicates whether or not a credit bucket should be refreshed with credits according to a corresponding refresh rate; and wherein the policing module is configured to decrement credit from the corresponding credit bucket and refresh credits of the corresponding credit bucket according to the corresponding refresh rate.

13. The hardware-based system of claim 12 wherein the action module simultaneously stores multiple sets of indexed action primitives that define different policing algorithms.

14. The hardware-based system of claim 12 wherein the relationship between the condition primitives and the action primitives defines a single rate three color marker (srTCM) policing algorithm.

15. The hardware-based system of claim 12 wherein the relationship between the condition primitives and the action primitives defines a two rate three color marker (trTCM) policing algorithm.

16. The hardware-based system of claim 12 wherein the relationship between the condition primitives and the action primitives defines a Metro Ethernet Forum (MEF) service policing algorithm.

17. The hardware-based system of claim 12 wherein the set of indexed action primitives determines the outgoing color of the datagram.

18. The hardware-based system of claim 12 wherein the set of indexed action primitives determines whether a policing failure will be reported.

19. The hardware-based system of claim 12 wherein the set of indexed action primitives determines whether the datagram will be dropped.

20. The hardware-based system of claim 12 wherein the set of indexed action primitives determines:

the outgoing color of the datagram;

whether a policing failure will be reported; and whether the datagram will be dropped.

21. The hardware-based method of claim 1 wherein:

the set of indexed action primitives comprises a first subset of action primitives and a second subset of action primitives;

the first subset of action primitives includes action primitives that are related to datagrams;

the second subset of action primitives includes action primitives that are related to bucket fullness.

22. The hardware-based method of claim 1 wherein:

the set of indexed action primitives comprises a first subset of action primitives and a second subset of action primitives;

the first subset of action primitives includes action primitives that indicate that a credit bucket should be decremented;

the second subset of action primitives includes action primitives that indicate whether or not a credit bucket should be refreshed.

* * * * *